United States Patent [19]

Yoshihashi et al.

[11] 4,087,100
[45] May 2, 1978

[54] SEAL ASSEMBLY

[75] Inventors: Akira Yoshihashi; Takeshi Kato, both of Hirakata, Japan

[73] Assignee: Kabushiki Kaisha Komatsu Seisakusho, Tokyo, Japan

[21] Appl. No.: 671,722

[22] Filed: Mar. 29, 1976

[30] Foreign Application Priority Data

Mar. 27, 1975 Japan .............................. 50-40163[U]

[51] Int. Cl.² .............................................. F16J 15/38
[52] U.S. Cl. ...................................... 277/92; 277/96.1
[58] Field of Search ..................... 277/92, 96 A, 96 R, 277/215, 81 R, 145; 305/11

[56] References Cited

U.S. PATENT DOCUMENTS

| 2,831,713 | 4/1958 | Smith | 277/92 |
| 3,147,013 | 9/1974 | Tracy | 277/96 A |
| 3,227,463 | 1/1966 | Wiese | 277/96 R |
| 3,540,743 | 11/1970 | Ashton et al. | 277/92 |
| 3,542,377 | 11/1970 | Voitik | 277/92 |
| 3,843,140 | 10/1974 | Mayer et al. | 277/96 A |

Primary Examiner—Richard E. Aegerter
Assistant Examiner—L. A. Footland
Attorney, Agent, or Firm—Armstrong, Nikaido, Marmelstein & Kubovcik

[57] ABSTRACT

A seal assembly disposed on a central longitudinal axis thereof which comprises a pair of annular rigid seal members and a pair of elastomeric retaining members. Each of the annular rigid seal members has a first seal surface, an annular groove and a second seal surface in sequence from the top.

1 Claim, 11 Drawing Figures

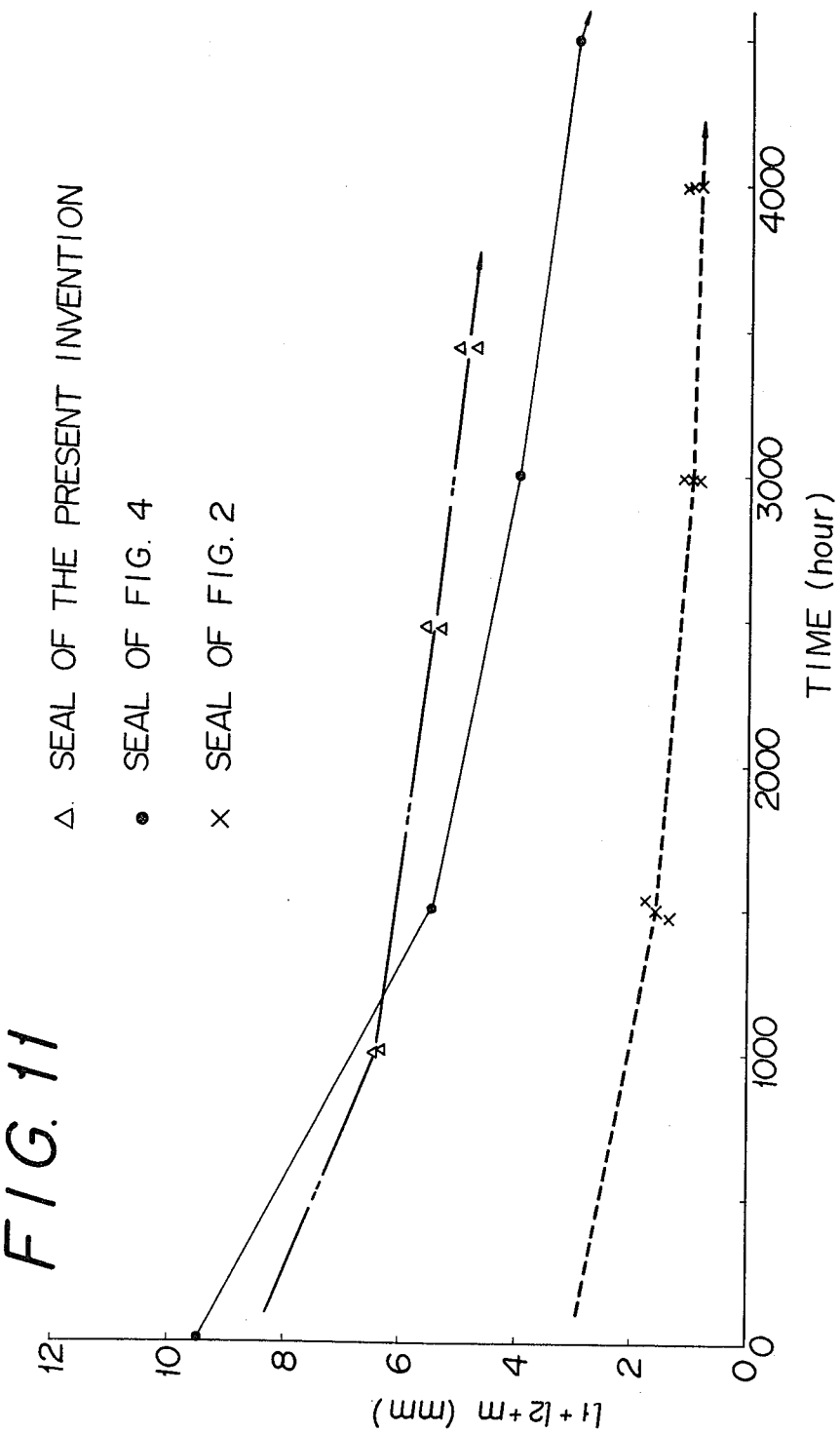

SEAL ASSEMBLY

BACKGROUND OF THE INVENTION

This invention relates to a seal assembly adapted to be mounted on axle systems and reduction gears of bulldozers and shovel bulldozers or the like for holding lubricating oil therein and preventing foreign matters such as soil and sand etc., from intruding into rotary parts of the bearings thereof.

The conventional seal assembly "A" is mounted, for example, as shown in FIG. 1, between a support shaft "a" and a lower rotary wheel "b" rotatably fitted on the support shaft from the outside thereof, and is of a construction wherein seal surfaces "d" of a pair of seal rings "c", "c" are abutted to each other with a pair of elastomeric retainer members mounted thereon whereby forming a seal surface "f" as shown in FIG. 2.

In such type of seal assembly, when it is put to use for a long period of time, its seal surface "d" tends to be worn by erosion from the outer peripheral portion thereof due to intrusion of soil and sand therein thereby reducing the effective width "h" of the seal surface "f" as shown in FIG. 3. When such seal assembly is used further, it is worn successively as illustrated by imaginary lines in FIG. 3 so that the effective width "h" of the seal surface "f" is remarkably reduced. As a result, the seal assembly will lose its sealing effect finally and cause oil leaks.

Further, if the seal surfaces "d" of the above-mentioned seal rings "c" are finished in smooth parallel surfaces, the outer peripheral ends of the seal surfaces "d" tends to form a small opening therebetween when the seal rings "c" are allowed to come into contact with each other with a pair of elastomeric retainer members mounted thereon. In consequence, earth and sand will intrude into the small opening to accelerate the erosion wear of the seal assembly so that the latter will lose its sealing effect in an early stage.

To overcome such difficulties, there has been proposed a seal assembly in which seal surfaces "d" of seal rings "c" are finished by lapping to form a taper respectively, towards the inner peripheral surfaces thereof so that the seal surfaces can tightly engage with each other when they are allowed to about to each other through elastomeric retainer members mounted thereon.

This construction is, however, disadvantageous in that the seal surfaces "d" of the seal rings "c" require to be tapered in the order of microns, and so it is very difficult to finish them by lapping.

Further, there has been proposed a seal assembly (U.S. Pat. No. 3,180,648) in which as shown in FIG. 4 the portions "g" below seal surfaces "d" of seal rings "c" are tapered so that wearing part "i" can extend radially in turn with the lapse of time of use. This type of construction is disadvantageous in that since the seal effect is provided by seal surfaces including a considerably large wearing portion "i," coarse particles of foreign matters tend to intrude through the wearing portion "i" into the seal surfaces so that the latter are worn out quickly due to a kind of gauzing action thereby losing their sealing effects very quickly.

SUMMARY OF THE INVENTION

It is, therefore, an object of the present invention to provide a seal assembly which enhances sealing effect remarkably. It is another object of the present invention to provide a seal assembly in which working or finishing of seal surface can be simplified.

I accordance with the present invention, a seal assembly disposed on a central longitudinal axis comprises a pair of annular rigid seal members and a pair of elastomeric retaining members disposed on said seal members for urging said pair of seal members to come into contact with each other.

Each of said annular rigid seal members has a first seal surface at the top end portion thereof, an annular groove located inside of the first seal surface, and a second seal surface positioned inside of the annular groove.

Since the seal surface is devided into two parts by the annular groove, the second seal surface performs its seal function effectively when the first seal surface has worn out. Other objects, features and advantages of the present invention will be readily apparent from the following description taken in conjunction with the following drawings.

BRIEF DESCRIPTION OF THE DRAWINGS

FIG. 11 is a graph showing the relationship between width of abutting seal surface and time retaining seal effect.

DETAILED DESCRIPTION OF THE PREFERRED EMBODIMENTS

Figure 5:
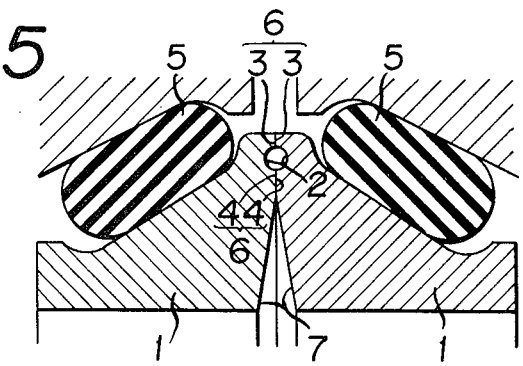
FIG. 5 is also similar to FIG. 2 but showing an embodiment of the present invention.
Figure 6:
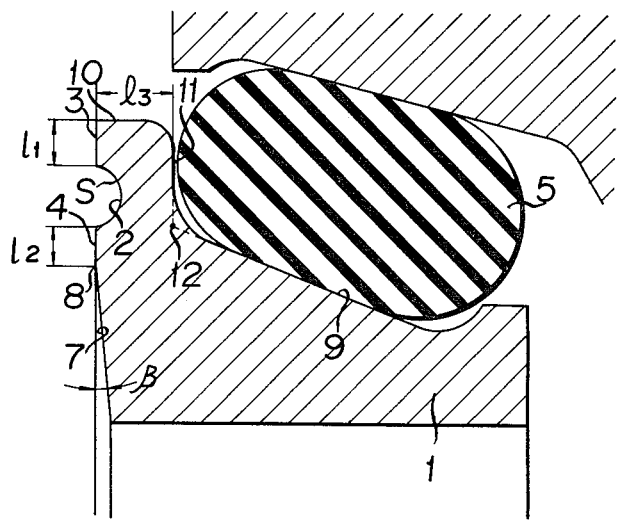
FIG. 6 is an enlarged cross-sectional view of FIG. 5.

A seal assembly according to the present invention will now be described in detail hereinbelow with reference to FIGS. 5 and 6. Each of seal surfaces of a pair of seal rings 1, 1 is formed with an annular groove 2 to form first and second seal surfaces 3 and 4. The pair of seal rings 1, 1 are allowed to abut to each other with elastomeric retainer members 5 such as "o" rings etc., mounted thereon thereby keeping the seal surfaces in a sliding contact to form slidable seal surfaces 6.

Figure 1:
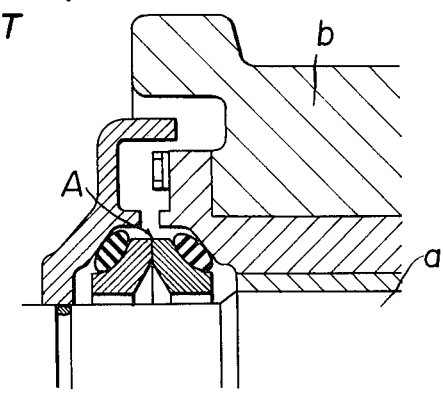
FIG. 1 is a cross-sectional view of a conventional seal assembly disposed in the track of a tractor.
Figure 2:
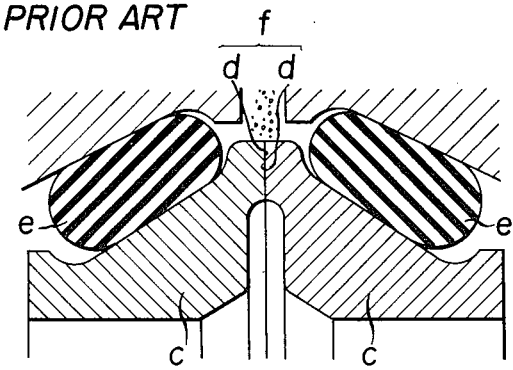
FIG. 2 is an enlarged cross-sectional view of the conventional seal assembly of FIG. 1.
Figure 3:
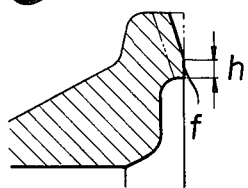
FIG. 3 is an explanatory view showing the degree of wear on the seal surface of FIG. 2.
Figure 4:
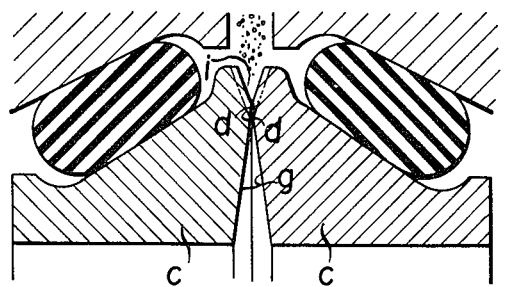
FIG. 4 is similar to FIG. 2 but showing another embodiment of the conventional seal assembly.

Each of the seal rings 1, 1 has below its seal surface an opposite face 7 which is tapered so as to expand internally. It is to be noted that the function of the annular groove 2 is important. Stated in brief, the conventional seal assemblies as shown in FIGS. 2 to 4 have each a seal surface always exposed to earth and sand newly intruded therein. Whilst, according to the seal assembly of the present invention, the annular groove 2 serves to divide the seal surface into the two, that is; the first seal surface 3 and the second seal surface 4. Therefore, if and when the first seal surface 3 is worn out to lose its sealing effect, earth and sand will accumulate into the annular groove 2. In this case, even if the first seal surface lose its sealing effect by its abrasion, the pair of seal surfaces are always kept in close proximity to each other so as to prevent the entry of earth and sand therein by the first seal 3 so that there is no fear of the annular groove 2 being directly exposed to newly intruding earth and sand. For this reason, the erosion wear of the second seal surface 4 can be reduced remarkably so that the lifetime thereof can be improved so much.

Figure 7:
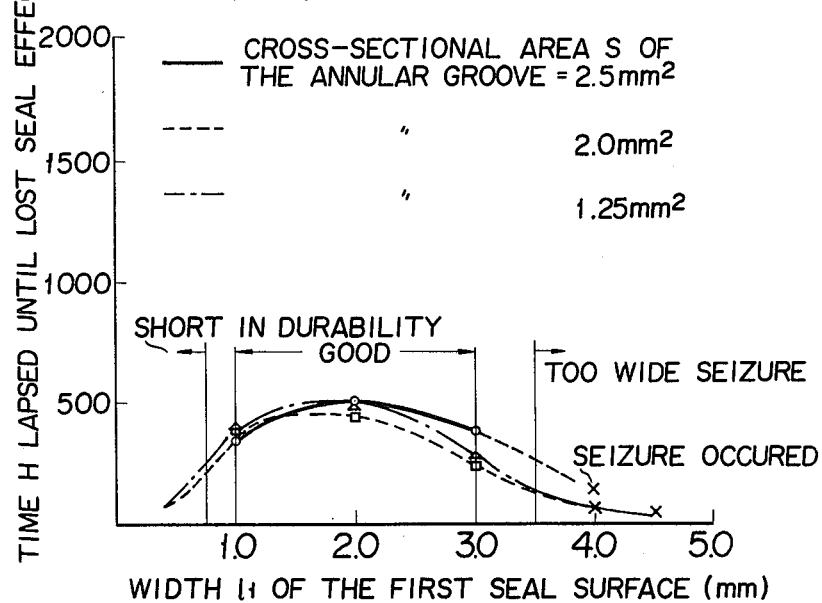
FIG. 7 is a graph showing the relationship between width $l_1$ of the first seal surface and time retaining seal effect employing the seal assembly of the present invention.
Figure 8:
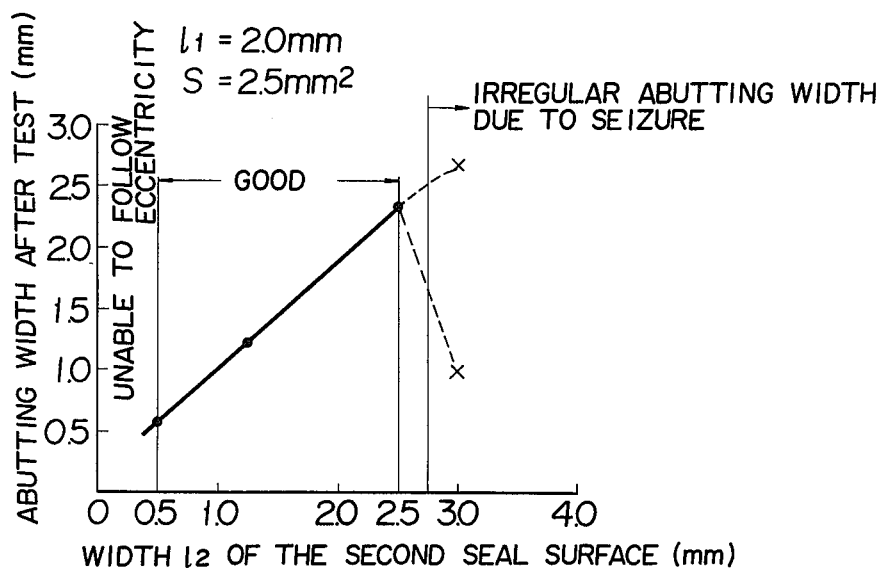
FIG. 8 is a graph showing the relationship between width $l_2$ of the second seal surface and width of abutting seal surface thereof.

The results of experiments obtained by altering the dimension of every part of a seal ring 1 having such configuration and outside diameter of about 10 cm are shown in FIGS. 7 to 11. FIG. 7 shows a graph in which the axis of abscissa represents the width $l_1$ of the first seal surface and the axis of ordinate represents the time H lapsed till the seal surface lost its sealing effect. This graph shows that an excellent sealing effect can be obtained when the diameterical width $l_1$ of the first seal surface is 1.0 to 3.0 mm, and the most suitable width is 2.0 mm. FIG. 8 shows a graph in which the axis of abscissa represents the width $l_2$ of the second seal surface, and the axis of ordinate represents the contact width of the second seal surface after the experiments are made. If the seal ring 1 having width $l_2$ of the second seal surface 4 which is less than 0.5 mm is installed on the endless track, the seal assembly cannot follow the eccentricity thereof so that desirable sealing effect cannot be obtained. Further, if the width $l_2$ is more than 3.0 mm, the seal surface tends to be seized up and become rough so that a deviation occurs in the contact width of the seal surface. Therefore, it can be said that a desirable effect can be obtained when the width $l_2$ of the second seal surface is 0.5 to 3.0 mm.

Figure 9:
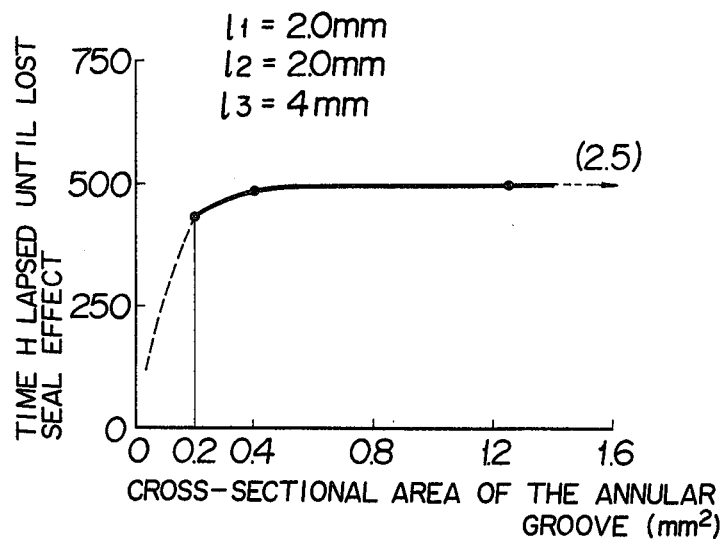
FIG. 9 is a graph showing the relationship between cross-sectional area S of the annular groove and time retaining seal effect of the first seal surface.

FIG. 9 shows a graph in which the axis of abscissa represents cross-sectional area S of the annular groove, and the axis of ordinate represents the time H lapsed till the seal assembly lost its sealing effect. The cross-sectional area S is shown as a semi-circular area in FIG 6. Experiments were made on a seal ring having $l_1 = 2.0$ mm, $l_2 = 2.0$ mm and $l_3 = 4$ mm. According to the results of the experiments, it was found that the cross-sectional area S of the annular groove 2 should be more than 0.2 mm².

Figure 10:
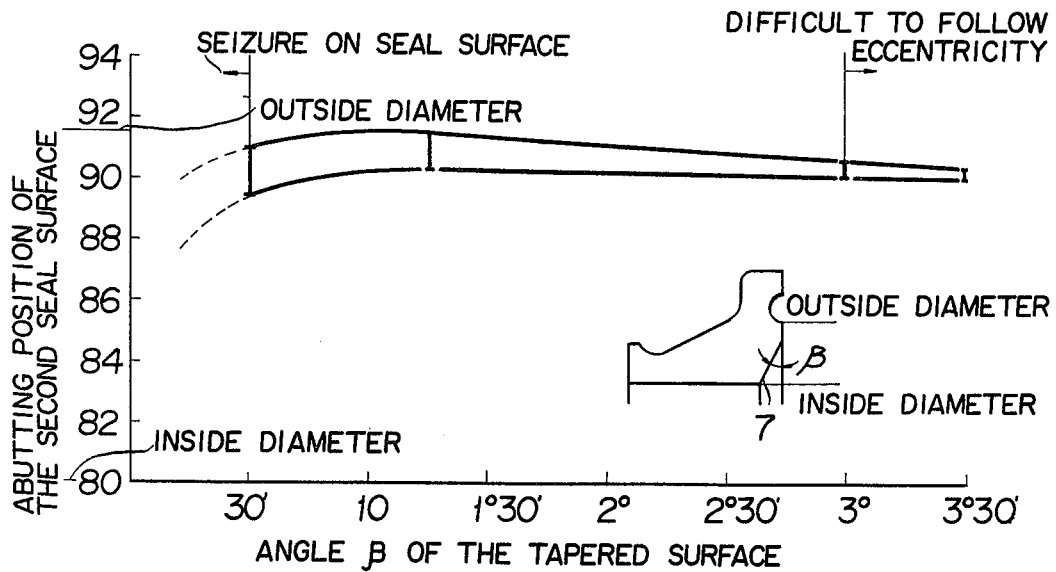
FIG. 10 is a graph showing the relationship between angle of the tapered surface and abutting position of the second seal surface.

FIG. 10 shows a graph in which the axis of abscissa represents angle $\beta$ of tapered surface 7 and the axis of ordinate represents the position of contact surface of the second seal surface. This graph indicates that desirable sealing effect can be obtained when the taper angle $\beta$ is 0.5° to 3°, and the most excellent sealing effect can be obtained when the angle $\beta$ is 1.25°.

FIG. 11 shows a graph in which the axis of abscissa represents the time in which sealing effect can be maintained, and the axis of ordinate represents $l_1 + l_2 + m$, wherein $l_1$ is the width of the first seal surface, $l_2$ is the width of the second seal surface, and $m$ is the width of the tapered portions to be brought into contact by the urging force applied through elastomeric members 5 when the seal ring 1 is installed on the endless track. As can be clearly seen from this graph, as the width of the seal surface $l_1 + l_2 + m$ approaches about 4.5 mm the time in which sealing effect can be maintained will increase.

Further, since the point 8 on the second seal surface 4 is located more inwards than the cross-point 12 of the support face 9 of "o" ring 5 and the rear face 11 of jaw 10, the rigidity of the second seal surface 4 can be increased so that even when the urging force on the seal surface is increased expansion of the seal surface can be prevented.

If the annular groove 2 is filled with grease, the time till the seal assembly loses its sealing effect can be prolonged.

What is claimed is:

1. A seal assembly, disposed on a central longitudinal axis, said seal assembly comprising a pair of annular rigid seal members, each of said seal members having a first seal surface at the top end portion thereof said first seal surfaces mating to form a first seal between said seal members, an annular groove positioned inside of the first seal surface said annular grooves mating to form an annular groove means for accumulating particles which pass through said first seal and, a second seal surface positioned inside of the annular groove said second seal surfaces mating to form a second seal between said seal members, wherein the facing surfaces of said seal members under the second seal surfaces are slightly tapered; and a pair of elastomeric retaining members disposed on said seal members for urging said pair of seal members to come into contact with each other to form said first and second seals with said annular groove means therebetween; and wherein widths of the first and second seal surfaces are about 1.0 to about 3.0mm and about 0.5 to about 3.0mm respectively, and wherein the cross-sectional area of said annular groove is more than 0.2mm².

* * * * *